United States Patent [19]

Jubinski

[11] Patent Number: 4,647,767
[45] Date of Patent: Mar. 3, 1987

[54] OPTICAL GONIOMETER CONTAINING IMMISCIBLE FLUIDS HAVING DIFFERENT REFRACTIVE INDICES

[75] Inventor: Paul Jubinski, Houston, Tex.

[73] Assignee: Western Geophysical Company of America, Houston, Tex.

[21] Appl. No.: 712,738

[22] Filed: Mar. 18, 1985

[51] Int. Cl.$^4$ .......................... H01J 40/14; G02B 6/28
[52] U.S. Cl. ............................. 250/227; 250/231 SE; 33/379; 350/96.15
[58] Field of Search ................. 250/227, 577, 231 SE; 356/141, 152, 249, 128, 133; 350/96.15, 96.32; 73/293; 33/379, 389; 116/202, DIG. 5, 26, 13

[56] References Cited

U.S. PATENT DOCUMENTS

| | | | |
|---|---|---|---|
| 4,287,427 | 9/1981 | Scifres | 73/293 |
| 4,443,699 | 4/1984 | Keller | 250/227 |
| 4,518,858 | 5/1985 | Southard | 250/227 |

FOREIGN PATENT DOCUMENTS

| | | | |
|---|---|---|---|
| 0134321 | 10/1980 | Japan | 73/293 |
| 0134322 | 10/1980 | Japan | 73/293 |

Primary Examiner—Edward P. Westin
Assistant Examiner—Charles Wieland
Attorney, Agent, or Firm—William A. Knox; Robert E. Lowe

[57] ABSTRACT

An optical encoding goniometer includes a rotatable chamber containing unequal volumes of two immiscible fluids having different indices of refraction and different densities. A plurality of optical fibers are bent to a critical radius and mounted in the chamber. The fiber cladding is exposed in different desired patterns along the bent fibers. The transmissivities of the respective fibers are measured as a function of the angular rotation of said chamber, the transmissivities of the fibers being governed by the radiation bending loss due to immersion of the exposed cladding in one of the two fluids.

24 Claims, 8 Drawing Figures

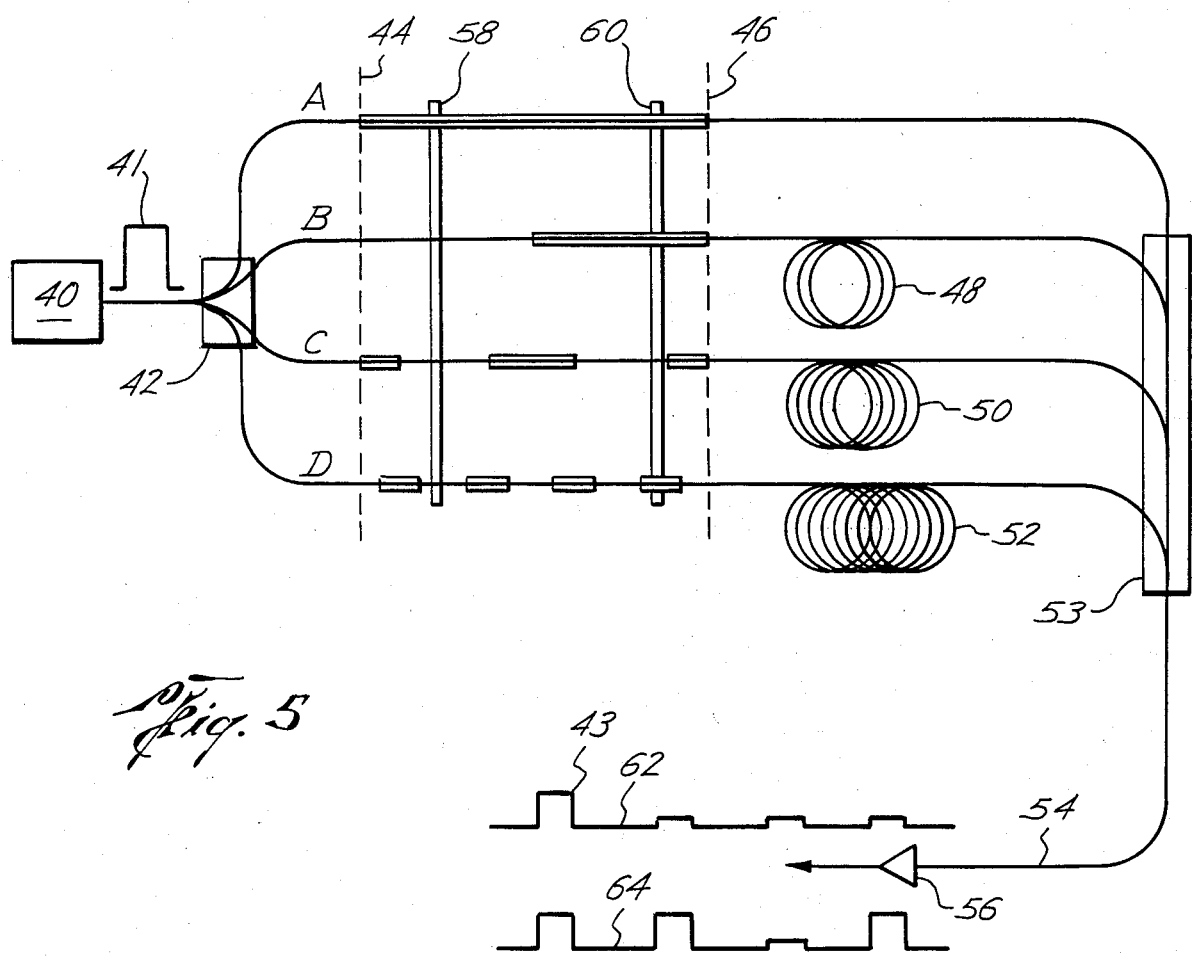
Fig. 5
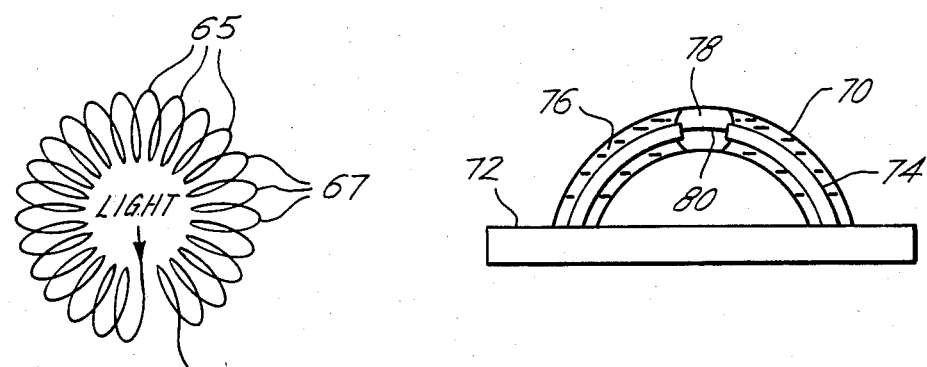
Fig. 6
Fig. 7

OPTICAL GONIOMETER CONTAINING IMMISCIBLE FLUIDS HAVING DIFFERENT REFRACTIVE INDICES

BACKGROUND OF THE INVENTION

1. Field of the Invention

The goniometer of this invention relates to the measurement of the angular displacement of a device or thing, relative to the gravitational vertical.

2. Description of the Prior Art

This disclosure teaches an encoding optical goniometer for measuring angular displacements of a device or thing with respect to the gravitational vertical. Related devices are shaft encoders for measuring the rotation of a stepping motor, roll indicators such as used in aircraft or a leveling device as used in topographic surveying. Such devices are usually equipped to provide an electrical or optical readout signal. The output signal may be analogue such as might be obtained from a rotary resolver, or digital such as might be produced by a binary shaft encoder. Digital output signals may be encoded in binary, octal or hexadecimal format. If necessary, ambiguities of $\pi$ radians are resolved by suitable means.

Many previous devices are designed to measure angular displacement with respect to an arbitrary reference. In the invention to be disclosed, I measure the absolute angular displacement referenced to the gravitational vertical.

SUMMARY OF THE INVENTION

I provide, in this invention, a goniometer in the form of an optical encoding angular rotation sensor characterized by having an absolute gravitational reference.

In accordance with an aspect of this invention, I provide a toroidal annular chamber, having a preselected critical radius, capable of rotation about a horizontal roll axis. The annular chamber contains unequal volumes of two immiscible liquids having different indices of refraction and densities. A plurality of cladded optical fibers, jacketed with an impermeable substance are mounted parallel to one another within the annular chamber, immersed in the liquids contained therein. Different lengths of the jacketing substance are stripped from each fiber at selected regions therealong to expose the fiber cladding. A different pattern of exposed cladding is provided for each of the respective fibers. Means are provided for launching a beam of radiation of a desired wavelength through the fibers. Means are provided for measuring individually the transmissivity of the respective fibers as a function of the absolute angular rotation of the sensor about the horizontal roll axis relative to the gravitational vertical.

In an aspect of this invention the annular chamber is nearly filled with a first liquid having an index of refraction much less than that of the cladding. A fluid-bubble of a second liquid, having a small desired volume, completes the filling of the annular chamber, the second liquid having an index of refraction equal to or slightly greater than that of the cladding.

In another aspect of this invention, the second fluid is more dense than the first liquid.

In yet another aspect of this invention, the second fluid is less dense than the first fluid.

In a further aspect of this invention, a source of radiation launches a radiation pulse into an input beam splitter which divides the radiation evenly between the plurality of fibers. Optical delay lines are coupled to the respective fibers, each delay line imparting a different unit time delay to a radiation pulse propagating through each fiber. The output ends of the fibers are coupled together to provide a common output. A detector coupled to he common output receives a train of radiation pulses that are separated in time by the unit delay time due to each delay line.

In accordance wth yet a further aspect of this invention, the emission levels of the radiant pulses seen by the detector have two states depending on the transmissivities of the respective fibers, the two states representing a binary one or zero. The pattern of ones and zeros in the pulse train represents the optically encoded angular position of the sensor.

BRIEF DESCRIPTION OF THE DRAWINGS

A better understanding of the benefits and advantages of my invention may be obtained from the appended detailed description and the drawings, wherein:

FIG. 5 is a schematic diagram of the optical circuit showing the method of encoding the angular position of the goniometer;

FIG. 6 illustrates use of a helical optical fiber for use with configurations requiring radii of curvature that exceed a critical radius of curvature; and FIG. 7 shows a means for applying the goniometer to leveling operations.

DETAILED DESCRIPTION OF THE PREFERRED EMBODIMENT

This disclosure teaches an optical-fiber, encoding, angular rotation sensor having a digital output signal which can serve as a goniometer. The sensor is intended to measure the angular displacement of an object around a horizontal roll axis. A modification of the sensor would permit its use in measuring the slope of a surface such as is used in topographic surveying.

A brief review of optical-fiber light transmission will be presented before embarking upon a detailed description of the preferred embodiments of this invention.

Figure 1:
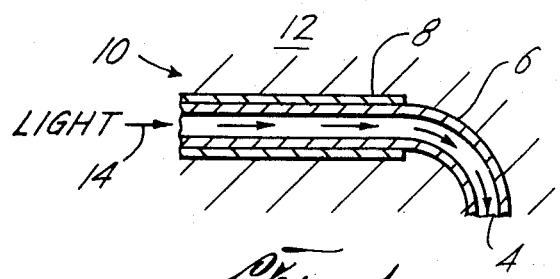
FIG. 1 illustrates a light beam propagating through a curved optical fiber immersed in a medium having a lower index of refraction than that of the fiber cladding.

An optical fiber (FIG. 1) consists of an inner core 4 of transparent silica and an outer transparent cladding 6 of a doped silica glass, but having a lower index of refraction than that of the core. The cladding is usually jacketed with one or more layers 8 of plastic such as TEFZEL (DuPont trademark) or an epoxy-acrylate. For purposes of this invention, the jacket could equally well be black paint or laquer, provided only that it is impermeable and insoluble in certain fluids as will be discussed later. Usually the difference in indices of refraction may be about 1%. Thus the index of refraction of the core might be 1.500 and the index of refraction of the cladding might be 1.485 for example. Light is guided within the core by wide-angle internal reflections at the core/cladding interface. Because of the difference in indices of refraction, nearly 100% of the radiation is totally reflected internally; very little escapes if the fiber surface is smooth and straight. Fibers may be classified as monomodal or multimodal, depending upon the core diameter. In a monomodal fiber, the diameter of the core is quite small, on the order of a few micrometers. Radiation propagates along a single path through the fiber. Multimodal fibers have a diameter of up to 100 micrometers. Because of the large core diameter, a beam of radiation may propagate along a plurality of different reflected paths or modes.

Manufacturers go to considerable trouble to minimize radiation transmission losses: The core diameter should be as small as possible; the ratio between the cladding thickness and the core radius should be as large as possible; a dimensionless quantity V, termed the characteristic modal parameter (a function of the ratio between core radius and radiation wavelength, and the index of refraction difference between core and cladding) should approximate a certain critical value.

Figure 2:
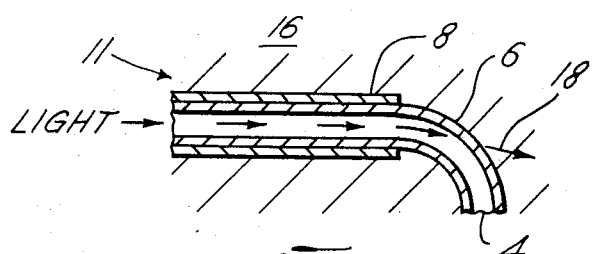
FIG. 2 is illustrative of the light loss when the curved fiber is immersed in an index-matching liquid.

If an optical fiber is bent around a curve, bending losses occur. The loss occurs because the curvature of the fiber changes the geometry of the internally-reflected rays. The radiation leakage due to bending losses attenuates the output beam of transmitted radiation. Depending upon the type of fiber, there is some critical lower radius of curvature where maximum radiation loss occurs without breakage of the fiber. At greater radii of curvature bending losses occur but are tolerable. The bending loss depends upon the refractive index of the medium in which the fiber is embedded. If there is a large contrast between the fiber cladding and the embedding medium, the bending loss will be minimal. For example, in FIG. 1, a beam of light 14 is launched into fiber 10 which is immersed in a fluid medium 12 such as air or water. Since the index of refraction of air (n=1.000) or water (n=1.330) is very much less than that of the cladding (n=1.485), radiation beam 14 is contained within the fiber and is not substantially attenuated even though the jacketing 8 is stripped away at the bend. In FIG. 2, fiber 11 is immersed in an index-matching fluid 16 such as clove oil (n=1.531) and light beam 18 is refracted out of the fiber as shown at that portion of the fiber where the cladding is exposed. The radiation output of fiber 11 would be greatly attenuated because of the very large bending loss. The bending loss therefore substantially reduces the transmissivity of the fiber.

Figure 3B:
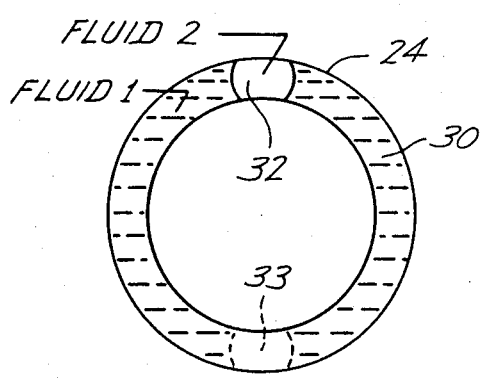
FIG. 3B illustrates the positions of a second-fluid-bubble as a function of relative fluid densities.
Figure 3A:
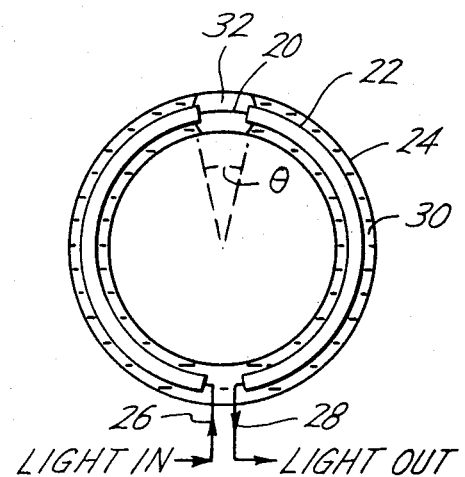
FIG. 3A shows an over-simplified diagram illustrating the operating principles of this invention.

An optical rotation sensor for measuring an angular displacement can be constructed based upon the concepts outlined above (FIG. 3A). A cladded optical fiber 20 (the core and cladding are not separately shown for reasons of clarity) is provided having an impermeable, insoluble jacket 22. Along a short portion of the length of the fiber, the jacket is stripped away, exposing the cladding, as in FIG. 3A. Next, the fiber is mounted as a single loop inside a toroidal annular chamber 24 so that it and the fiber have a radius of curvature a little bit larger than the critical radius. The ends 26, 28 of the fiber are brought out from chamber 24 by any convenient, fluid-tight seal means. The chamber 24 need not necessarily be toroidal; it could take the form of a cylinder or other shape. The chamber could have a rectangular cross-section instead of a circular cross-section.

Chamber 24 is nearly filled with a volume of a first fluid 30 such as water (n=1.333) whose index of refraction is much less than that of fiber cladding 20. Suitable filling means, not shown, are provided. A bubble 32 of a second, index-matching fluid having an index of refraction equal to or greater than cladding of fiber 20 fills the remaining chamber volume. One such fluid might be clove oil (n=1.531) or ethylene bromide (n=1.52).

The index-matching fluid must be immiscible with the first fluid. It must also be characterized by a different specific gravity such that the bubble will either rise to the top of the annular chamber or sink to the bottom when the roll axis of the annular chamber (normal to the plane of the drawing) is substantially horizontal. For example, see FIG. 3B. If fluid 2 is less dense than fluid 1, the bubble rises to the top of the chamber 24 as at 32. If it is more dense, it sinks to the bottom as shown by dashed lines 33. That characteristic of the bubble furnishes an absolute reference point with respect to the gravitational vertical.

Referring again to FIG. 3A, a beam of radiation is directed into fiber end 26. With the elementary sensor in the angular position shown in the Figure, the exposed cladding of fiber 20, immersed in index-matching fluid 32, allows maximum radiation leakage such that the level of the radiation emission as observed and measured at fiber end 28 will be greatly attenuated.

If now, annular chamber 24 is rotated to the left or right, exposed cladding 20 will become immersed in first fluid 30. Radiation can no longer leak from the exposed cladding so that the radiation emmission level as observed and measured at output 28 will then be a maximum. Thus, in the angular position shown in FIG. 3A, the radiation emission level will be a minimum when the exposed cladding is aligned with the gravitational vertical and it will be a maximum for all other angular positions. In FIG. 3A, it is assumed that the cladding is not actually exposed to the fill fluids at the fiber takeout ports at the bottom of the chamber. It is also assumed that the index-matching second fluid is less dense than the first fluid so that it floats but it should be understood that the inverse situation would function equally well.

As disclosed earlier, a well-designed fiber intended for conventional use has a very thick cladding with respect to the core. Further, most optical fibers are designed for use with a source of radiation having a specified wavelength such as 0.8–0.9 micrometers, in the near infrared part of the spectrum. Such fibers have a low bending loss even when bent to critical radii of a few millimeters, at which radius however, they tend to break. For purposes of this disclosure, I require a fiber having a critical radius of a few centimeters to minimize fiber breakage. The difference in fiber transmissivities, when the exposed cladding of a bent fiber is alternately immersed in one of the two different fluids, must be substantial. That is, the fiber must have a high bending loss at moderate radii of curvature when immersed in the second index-matching fluid. I have found that the lossy characteristics of a fiber may be increased by substantially reducing the ratio between cladding thickness and core diameter or by selectively adjusting the wave length of the incident radiation.

A single fiber configured as shown in FIG. 3A could serve as an optical switch. With annular chamber 24 oriented as shown, the measured radiation emission level is at a minimum; the switch is "off". At any other angular displacement, the measured radiation emission level at output 28 is a maximum; the switch in "on". Such an arrangement could be used in a control loop to hold a rotatable mechanism level with respect to the gravitatioal vertical.

Figure 4:
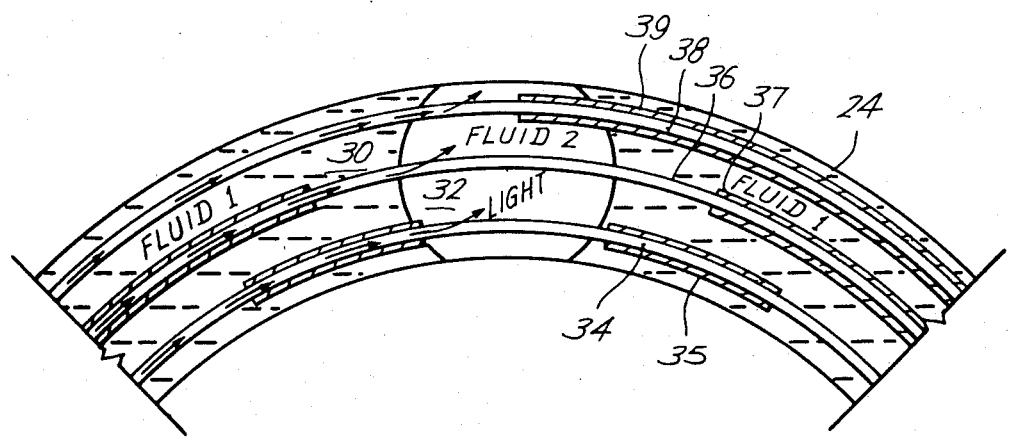
FIG. 4 is a somewhat more detailed diagram of said operating principles.

In FIG. 3A, to simplify the explanation, a single fiber was illustrated. That arrangement is capable only of detecting the fact that the orientation of the annular chamber has departed from the vertical. A goniometer having greater angular resolution employs a plurality of optical fibers, each having different exposed cladding lengths with different spacings between exposed lengths such as shown in partial cross section in FIG. 4. There three cladded fibers 34, 36, 38 are shown, having jacketing material 35, 37, 39. Different lengths of jacketing material have been stripped away from each fiber as shown in FIG. 4 so that each fiber has a different pattern of exposed cladding. The measured transmissivity level of each fiber can be taken as one bit of a binary code, the code changing for different angular positions as different patterns of exposed cladding lengths become aligned with the second-fluid bubble.

FIG. 5 is a schematic illustration of a multiple-fiber goniometer such as shown in FIG. 4, but flattened out for illustrative purposes. A pulsed radiation source 40 such as a light-emitting diode or a laser sends a pulse into a rank of beam splitters 42 which distribute the radiation equally into the respective fibers A, B, C, D. Dashed lines 44, 46 represent the confines of the annular chamber such as 24. When the fibers emerge from the chamber at 46, the output ends of fibers B, C, D are connected to optical delay lines 48, 50, 52 for introducing a delay of one time unit, two time units and three time units. Fiber A has zero time delay. The output ends of the delay lines are coupled together as shown by a suitable directional coupler 53, to produce a common output line 54 which is coupled to a suitable radiation detector 56. The delay lines could of course be placed at the input ends of the fibers instead of the output ends.

In operation, radiation source 40 emits a light pulse 41 of desired duration. The pulse enters beam splitter 42, propagates through fibers A-D but, because of the delay lines, emerges from common output 54 as a train of pulses, each spaced apart in time by one time unit. Fiber A is jacketed throughout its entire length. Regardless of the angular orientation of the sensor, the emission level at output fiber 54 remains constant at maximum level. Because the input pulse has been split into four equal parts by beam splitter 42, a full-scale output pulse 43 will have a level approximately one-fourth of the input level.

Assume now that the sensor has been rotated such that the bubble 32 of FIG. 4 is aligned with exposed cladding portions of the fibers as shown at the narrow box 58, FIG. 5, in a manner similar to that shown for FIG. 4. Box 58 represents second-fluid bubble 32 of FIG. 4. Since all of fiber A is jacketed, the first pulse will be undelayed; it will be at maximum amplitude; it acts as a sync pulse for the pulsed data stream. All of the remaining pulses will have minimal amplitude level because of the bending losses that occur in the bubble as represented by box 58, thereby resulting in the binary code 1000 as shown at trace 62 measured in terms of the transmission loss.

Now assume that the sensor has rotated such that the fiber-pattern alignment is as shown at box 60 with box 60 again representing a bubble of an index-matching fluid. Here fibers A, B and D will transmit pulses having maximal amplitudes but fiber C will have minimal amplitude, resulting in the binary code 1101, as shown at trace 64.

In the above examples, only three fibers and a reference were shown; many more fibers could be used to increase the resolution of the sensor. The ultimate angular resolution of the sensor depends upon the shortest usable length of exposed cladding which in turn depends upon the shortest usable length of the bubble itself. In other words, the angle subtended by the exposed cladding approximates the angular arc subtended by the bubble (FIG. 3A). All of the fibers may be mounted in the same annular chamber or each fiber could be mounted in a separate chamber, the separate chambers being ganged together on a common shaft.

If the requirements for the physical size of the sensor are such that the radius of curvature of the annular chamber (the major axis) must be quite large with respect to the critical bend radius, it would be feasible to wind the fiber or fibers as a helix as in FIG. 6. The radius of curvature of the individual helical coils (the minor axis) would be designed to be a little bit larger than the critical radius for the fiber in question. The helix as a whole is then curved to the required working radius. A plurality of helices would serve in place of a plurality of individual fiber elements of FIGS. 4 or 5. The jacketing material would be selectively stripped away from the outer perimeters of the individual helical coils as indicated at 65 and 67.

The elemental sensor of FIGS. 3A could be configured to function as a topographic level as shown in FIG. 7. The ring-shaped annular chamber would be replaced by a segment of a hollow toroidal tube 70. The open ends of the toroidal tube 70 would be sealed and provided with fiber-outlet ports, not shown. The entire unit is then mounted on a suitable plane-parallel bar or block 72. As many jacketed fibers 74 as desired (one is shown but more can be used), with jacketing stripped away as at 80, are provided to obtain the desired angular resolution. The toroidal segment is then filled with unequal volumes of the first and second fluids 76, 78 as before.

The radiation source 40 and radiation detector 56 may be configured in any desired arrangement. They may be integral with the goniometer or the input and output fibers of the goniometer could be coupled to a stationary source and receiver through an optical slip ring as shown in U.S. Pat. No. 4,398,791. The particular arrangement is not germane to this invention.

The goniometer of this invention finds use in conjunction with rotatable devices that do not otherwise have a fixed reference point. One such application might be roll measurement of an aircraft. Another use would be to measure or control the rotation of an instrumented fish towed through the water for oceanographic studies. A third area of use is for monitoring the twist of a seismic hydrophone cable that is free-towed through the sea by a ship.

For illustrative purposes, my invention has been described wth a certain degree of specificity. Variations will occur to those skilled in the art but which may be included within the scope and spirit of this invention which is limited only by the appended claims.

I claim as my invention:
1. An optical goniometer comprising:
    a chamber mounted to rotate about a substantially horizontal roll axis;
    unequal volumes of two immiscible fluids having different indices of refraction and different densities contained in said chamber;
    an optical fiber including a cladding having a known index of refraction, said fiber being jacketed with an impermeable, insoluble substance, the fiber being bent to a preselected radius and immersed in said fluids, a preselected length of said impermeable substance being stripped from the fiber exposing the cladding;

a source means for launching radiation into said fiber; and detector means for measuring the level of the radiation transmission loss, through said fiber as a function of the absolute angular displacement of said goniometer relative to the gravitational vertical.

2. The goniometer as defined by claim 1, comprising:

a first fluid, having an index of refraction much less than that of the cladding of said fiber, nearly filling said annular chamber;

a small volume of a second fluid, having an index of refraction that matches that of the cladding, forming a bubble in said first fluid.

3. The goniometer as defined by claim 2 wherein said second fluid is more dense than said first fluid.

4. The goniometer as defined by claim 2 wherein said second fluid is less dense than said first fluid.

5. An optical encoding goniometer comprising:

a toroidal chamber having a preselected major radius of curvature mounted to rotate about a substantially horizontal roll axis;

unequal volumes of two immiscible fluids having different indices of refraction and different densities contained within said chamber;

a plurality of optical fibers, having radiation input and output ends, the fibers including a cladding having a known index of refraction, said fibers being jacketed with an impermeable, insoluble substance, the fibers being mounted adjacent to one another in said toroidal chamber and immersed in said fluids, different lengths of said impermeable substance being stripped from the respective fibers at different regions therealong, thereby to form different patterns of exposed cladding on each of the respective fibers;

a source of radiation for launching a beam of radiation having a preselected wavelength into said fibers; and detector means for measuring the levels of the relative radiation transmission losses through said fibers due to immersion of said different patterns of exposed cladding in one of said two fluids, the measured levels defining a code determinative of the absolute angular displacement of said goniometer relative to the gravitational vertical.

6. The goniometer as defined by claim 5, comprising:

a first fluid, having an index of refraction much less than that of the cladding of said fibers, nearly filling said toroidal chamber;

a lesser volume of a second fluid, having an index of refraction that matches that of the cladding, forming a bubble in said first fluid.

7. The goniometer as defined by claim 6 wherein said second fluid is more dense than said first fluid.

8. The goniometer as defined by claim 6 wherein said second fluid is less dense than said first fluid.

9. The goniometer as defined by claim 7 or 8, comprising:

means for causing said radiation source to emit a radiant input pulse;

a beam splitter to distribute the energy of said radiant pulse evenly between the inputs of said plurality of optical fibers; and an optical delay line coupled to each said optical fiber, each delay line imparting a different unit time delay to the input pulse propagating through the respective optical fibers, the output ends of said fibers being coupled to a common output line, so that an output train of radiant pulses may be received by said detector.

10. The goniometer as defined by claim 9, wherein the radiation emission level as seen by said detector has two states depending upon the transmissivities of the respective optical fibers, the two states representing a binary one and a binary zero, the pattern of ones and zeros of the output pulse train defining an angular displacement code.

11. The goniometer as defined by claim 6, wherein the radius of curvature of said toroidal chamber is larger, by a preselected tolerance, than a predetermined critical radius appropriate to the particular optical fibers used.

12. The goniometer as defined by claim 6, wherein the arc subtended by the shortest length of exposed cladding of a curved fiber is substantially equal to the arc subtended by the second-fluid bubble.

13. The goniometer as defined by claim 10 wherein one optical fiber is characterized by a zero-delay line and remains completely jacketed to provide a sync pulse for said pulse train.

14. The goniometer as defined by claim 13, wherein said jacketing substance is a plastic material.

15. The goniometer as defined by claim 13 wherein said jacketing substance is an opaque paint.

16. An optical encoding goniometer comprising:

a segment of a hollow torus having a preselected radius of curvature, the open ends of said segment being sealed by a plane parallel supporting bar;

unequal volumes of two immiscible fluids, having different indices of refraction and different densities, contained within said segment;

a plurality of optical fibers having a cladding of known index of refraction, the optical fibers being jacketed with an impermeable substance, the fibers being mounted adjacent to one another within said segment and immersed in said fluids, different lengths of said impermeable jacketing substance being removed from different regions along said fibers, thereby to form different patterns of exposed claddings on the respective fibers;

a source of radiation for launching a beam of radiation, having a preselected wavelength, through said fibers; and a detector for measuring the relative transmissivities of each said fiber, the transmissivity levels being determinative of the absolute angular displacement of said plane parallel supporting bar relative to the gravitational vertical.

17. The goniometer as defined by claim 2, wherein said first fluid is gaseous and said second fluid is a liquid.

18. The goniometer as defined by claim 2 wherein said first fluid and said second fluid are both liquids.

19. The goniometer as defined by claim 5, wherein each said fiber is configured as a single loop.

20. The goniometer as defined by claim 5, wherein each said fiber is configured as a helical coil.

21. An optical angular rotation sensor comprising:

a curved chamber containing immiscible fluids having different refractive indices;

an incompletely jacketed, cladded optical fiber mounted in said chamber;

means for injecting light into said fiber; and means for measuring the light level emerging therefrom as a function of the absolute angular displacement of said sensor relative to the gravitational vertical.

22. The rotation sensor as defined by claim 21 wherein said fluids are of differing densities.

23. The rotational sensor as defined by claim 21 further including:
a second incompletely jacketed, cladded optical fiber having a jacketing arrangement different from that of said first fiber.

24. The rotational sensor as defined by claim 22 further including an incompletely jacketed, cladded optical fiber having a different jacketing arrangement than said first optical fiber.

* * * * *